(12) United States Patent
Barthomeuf et al.

(10) Patent No.: US 7,243,753 B2
(45) Date of Patent: Jul. 17, 2007

(54) CARRIER VEHICLE FOR DRILLING OR ROCKBOLTING MACHINE

(75) Inventors: Jean-Claude Barthomeuf, Lucenay (FR); Franck Leon, Lyon (FR); Alain Comorge, Genas (FR); Alexandre Miralles, Vienne (FR)

(73) Assignee: Sandvik Mining and Construction Lyon SAS, Meyzieu (FR)

( * ) Notice: Subject to any disclaimer, the term of this patent is extended or adjusted under 35 U.S.C. 154(b) by 457 days.

(21) Appl. No.: 10/876,535

(22) Filed: Jun. 28, 2004

(65) Prior Publication Data

US 2005/0029796 A1    Feb. 10, 2005

(30) Foreign Application Priority Data

Jun. 26, 2003   (FR) .................................. 03 07722

(51) Int. Cl.
*B60K 17/34*    (2006.01)
(52) U.S. Cl. ................ 180/233; 280/5.514; 280/6.153; 173/218
(58) Field of Classification Search ............ 280/5.514, 280/5.524, 6.153, 6.155, 6.157; 173/39, 173/217, 218; 180/233, 245, 246
See application file for complete search history.

(56) References Cited

U.S. PATENT DOCUMENTS

| | | | | |
|---|---|---|---|---|
| 3,851,481 | A | | 12/1974 | Swoager |
| 3,917,005 | A | * | 11/1975 | Cannon et al. ............. 173/189 |
| 4,247,126 | A | * | 1/1981 | Claxton .................... 280/6.155 |
| 4,637,475 | A | * | 1/1987 | England et al. ............. 173/193 |
| 4,998,590 | A | * | 3/1991 | Wells .......................... 175/162 |
| 5,125,460 | A | | 6/1992 | Behrens |
| 5,363,925 | A | * | 11/1994 | Gallagher ................... 173/186 |
| 6,129,226 | A | * | 10/2000 | Donovan .................... 212/300 |
| 6,196,555 | B1 | * | 3/2001 | Gaibler ..................... 280/6.154 |
| 6,896,072 | B2 | * | 5/2005 | MacDonald ................ 173/192 |
| 2005/0103509 | A1 | * | 5/2005 | Barthomeuf et al. .......... 173/46 |

FOREIGN PATENT DOCUMENTS

DE    28 55 486 A    7/1980
GB    1583574 A    1/1981

* cited by examiner

*Primary Examiner*—Paul N. Dickson
*Assistant Examiner*—Toan To
(74) *Attorney, Agent, or Firm*—Oliff & Berridge PLC

(57) ABSTRACT

The invention relates to drilling or rockbolting machines, for the execution of underground works, in particular in mining operations. The carrier vehicle comprises a chassis and four wheels, all driving wheels, with two wheels situated on the right-hand side of the chassis of the vehicle and two other wheels situated on the left-hand side of the chassis. The four wheels are of the independent suspension type, having a jack-controlled height, and each comprise rotation-drive means, especially hydraulic motors. The chassis receives, at the front and at the rear, working equipment, such as drilling arms with respective guides, the basic position of which is horizontal and transverse to the direction of displacement of the vehicle. This carrier vehicle is applicable to the realization of a machine, which can be used in mine galleries of low height.

8 Claims, 3 Drawing Sheets

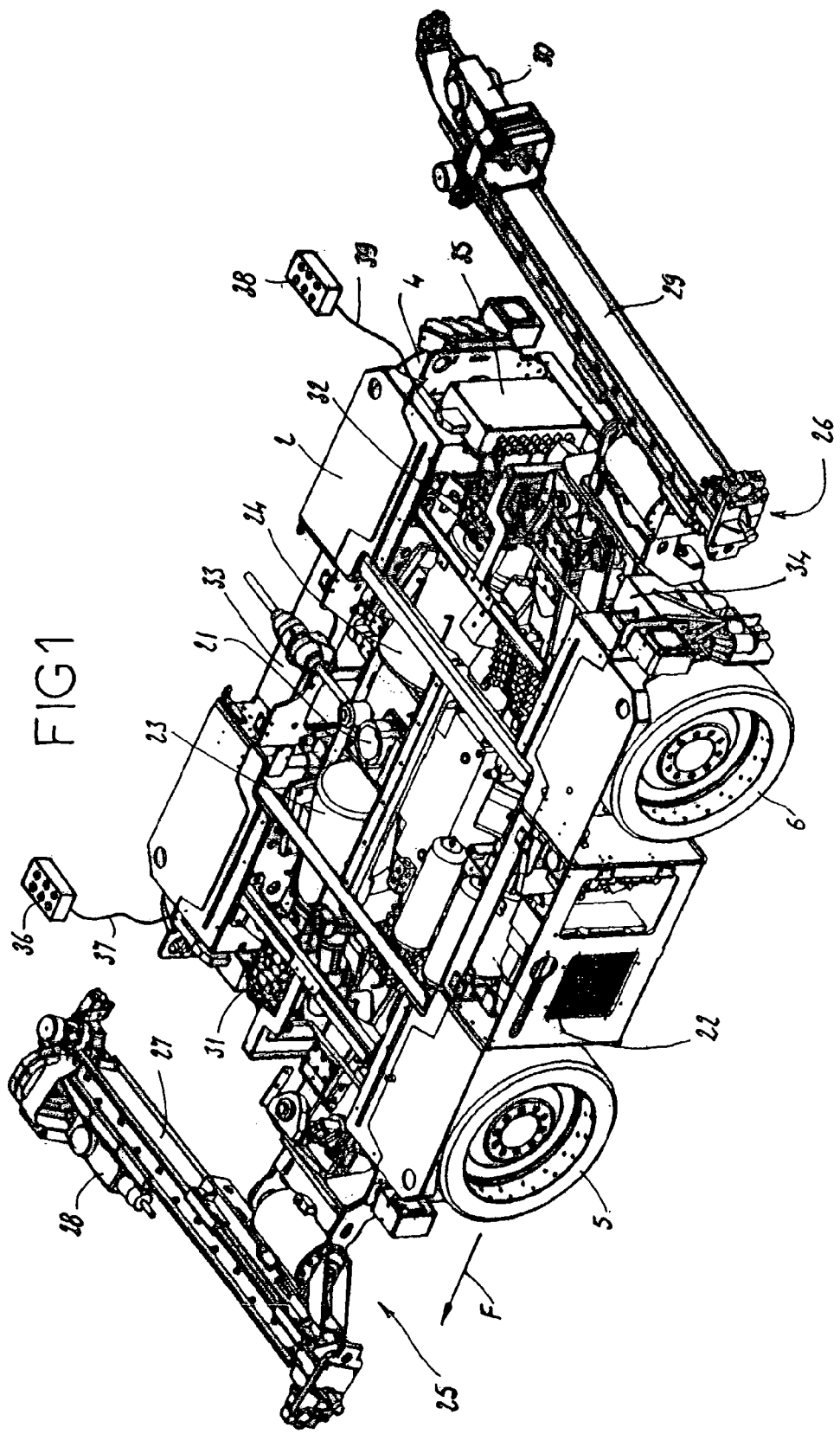

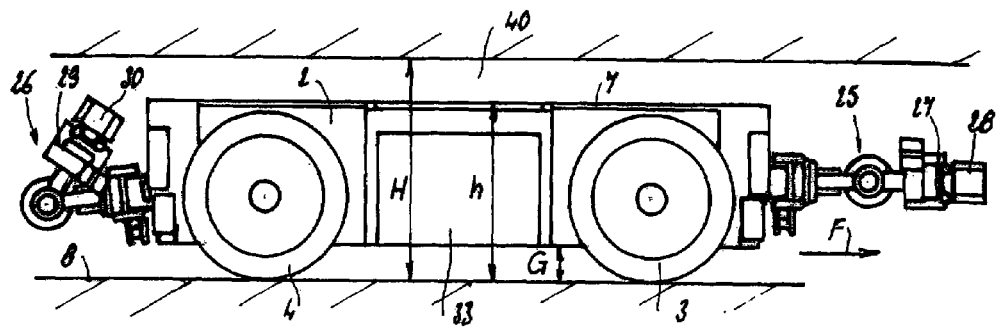
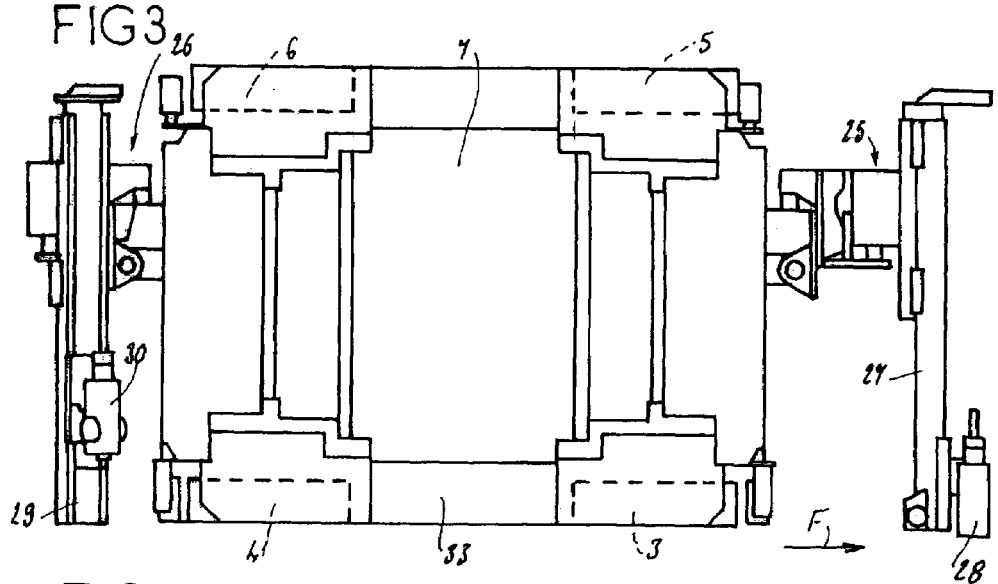
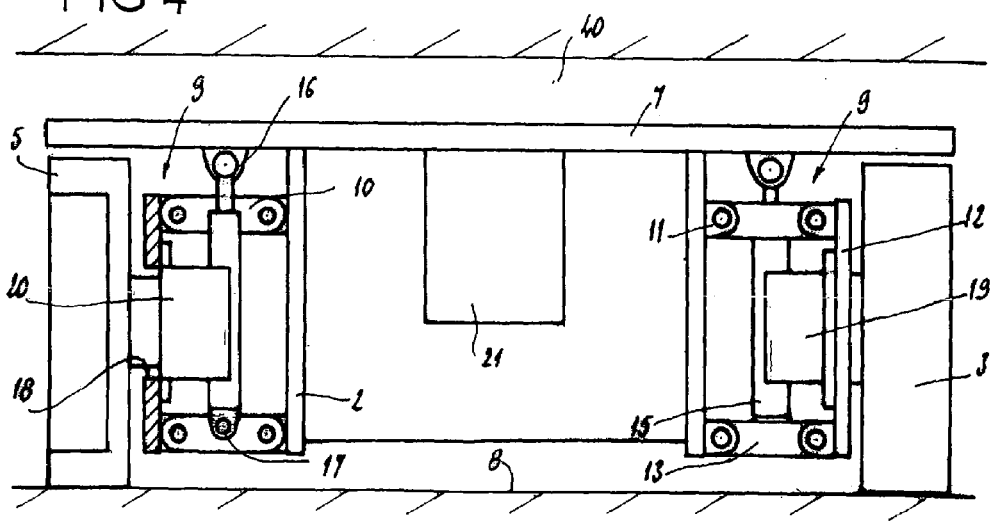

CARRIER VEHICLE FOR DRILLING OR ROCKBOLTING MACHINE

TECHNICAL FIELD

The present invention relates in general terms to drilling or rockbolting machines, intended for the execution of underground works, in particular in mining operations. This invention relates more particularly to the design of the "carrier vehicle" part of such machines, this part supporting the working equipment, in particular the drilling or rockbolting equipment.

BACKGROUND

Traditional drilling or rockbolting machines usually comprise a four-wheeled "carrier vehicle" part with rigid or articulated chassis, a part which bears at the front one or two drilling or rockbolting arms, the basic orientation of which is parallel to the direction of displacement of the machine. By way of examples, reference is here made to European patent application EP 0 890 704 A in the name of the Applicant, relating to a machine with articulated chassis, and to U.S. Pat. No. 3,917,005, which describes a rigid-chassis vehicle. Tracked carrier vehicles are also known in this field—see, for example, patent GB 1583574.

These existing machines are usually relatively space-consuming, especially in height, which prevents their use in mine galleries of low height. Moreover, the arrangement of their drilling or rockbolting arms generally only allows these machines to be used with their longitudinal displacement axis perpendicular to the working face.

Another problem encountered in the use of such drilling or rockbolting machines is the unevenness of the ground in the mine galleries over which the carrier vehicle has to move and has also to be immobilized for drilling or rockbolting operations. The ground in a mine gallery usually has substantial changes in level, from one point to another, and supports or "props" provided on these carrier vehicles, in addition to their wheels, are usually used to stabilize them in an arrested working position—see, for example, the aforesaid U.S. Pat. No. 3,917,005, or U.S. Pat. No. 3,851,481, or, indeed, German document DE 2855486 A.

The present invention sets out to eliminate these drawbacks or usage limitations of current machines by providing a particularly compact carrier vehicle, designed for use in low-height galleries and allowing a different and advantageous working method, whilst adapting to unevennesses in the ground.

SUMMARY

To this end, the subject of the invention is a carrier vehicle for a drilling or rockbolting machine, essentially characterized in that it comprises a rigid chassis and four wheels, all driving wheels, i.e. two driving wheels situated on the right-hand side of the chassis of the vehicle and two other driving wheels situated on the left-hand side of this chassis, these four driving wheels being of the independent suspension type and having a height independently controlled by driving means, and each comprising motorized rotation-drive means, the said chassis receiving, at the front and/or at the rear, working equipment, especially drilling or rockbolting equipment.

In a preferred embodiment of the invention, the independent suspension of each of the four driving wheels of the carrier vehicle is a deformable-parallelogram-type suspension, actuated by a hydraulic jack allowing adjustment of the ground clearance for each wheel.

Advantageously, the four driving wheels of the carrier vehicle are non-steerable wheels and their motorized rotation-drive means comprise, for the two wheels situated on the right-hand side of the chassis, respective hydraulic motors fed by a first pump or a first motor-driven pump unit, and for the two wheels situated on the left-hand side of the chassis, respective hydraulic motors fed, independently of the previous ones, by a second pump or a second motor-driven pump unit. These are constituted, in particular, by two electric motor-driven pump units, or by two pumps driven by a common motor.

The chassis further contains a hydraulic reservoir, common to the whole of the hydraulic displacement and working members and equipment of the drilling or rockbolting machine.

In one embodiment of this carrier vehicle, suitable for the structure of a drilling machine, the chassis bears, at the front and at the rear, a front drilling arm and a rear drilling arm respectively, each with a drilling guide, the basic position of which is horizontal and orientated perpendicularly to the longitudinal direction of displacement of the carrier vehicle on its wheels.

All in all, a machine, especially a drilling machine, is thus obtained having a very compact, short configuration, in particular less than one meter in height, both as regards its "carrier vehicle" part and as regards its drilling equipment, which allows it to be used in mine galleries whose worked height lies within the range 1 meter to 1.5 meters.

As far as the actual "carrier vehicle" part is concerned, the invention produces the following advantages:

- The controlled independent suspension of each of the four driving wheels, actuated by a hydraulic jack, allows the height of the machine to be adjusted to the changes in level and unevennesses in the ground by ensuring a perfect stability both in the longitudinal direction of displacement and tilt-wise. Since the ground clearance is thus independently adjustable for each wheel, the carrier vehicle can run without difficulty over very uneven ground; in the locked working position, moreover, this carrier vehicle can be stabilized by adjusting the height of each wheel without having to resort to stabilizing supports or "props".
- The independent control of the two right-hand driving wheels, on the one hand, and of the two left-hand driving wheels, on the other hand, with on each side a possibility of forward travel, reverse travel or complete stop, allows a direction to be procured by "slippage", analogous to that of a tracked vehicle, without the need to orientate the wheels and with the possibility of rotating the carrier vehicle "on the spot", which makes this carrier vehicle extremely maneuverable for its positioning and its displacement.
- The parking of the machine, for its part, also becomes very simple.

Another aspect of the invention, when applied to a drilling machine, is the presence of two drilling arms placed respectively at the front and rear of the carrier vehicle, with a transverse basic position of the drilling guides (unlike the traditional design having arms situated only at the front and directed in the longitudinal direction of the "carrier vehicle" part). This gives rise to the following additional advantages, likewise considering the particular characteristics of the "carrier vehicle" part.

- The displacement of the carrier vehicle takes place parallel to the drilling face, with a reduced displacement time between two stop positions corresponding to holes which are to be drilled consecutively.

The realization of mutually parallel holes becomes particularly easy.

Each drilling arm can be separately conducted, without risk of interference between the two arms.

Visibility in the course of drilling is improved.

It will also be noted that the use of the machine can be facilitated by telecontrols and especially radio controls, or cable-transmitted telecontrols, on the one hand, for ground movements of the "carrier vehicle" part and, on the other hand, for the positionings and movements of the two drilling arms, front and rear respectively, or of all other working equipment.

The invention will be better understood with the aid of the following description with reference to the appended diagrammatic drawing, which represents, by way of example, an embodiment of this carrier vehicle, applied to a drilling machine.

BRIEF DESCRIPTION OF THE DRAWINGS

FIG. 1 is a general view, in perspective, of a drilling machine with carrier vehicle according to the present invention, the top plates of the chassis of this vehicle being removed;

FIG. 2 is a side view of the carrier vehicle forming the subject of the present invention, operating in a mine gallery;

FIG. 3 is a plan view from above of the carrier vehicle of FIGS. 1 and 2;

FIG. 4 is a cross-sectional view, simplified and on a larger scale;

EMBODIMENTS

Figure 5:
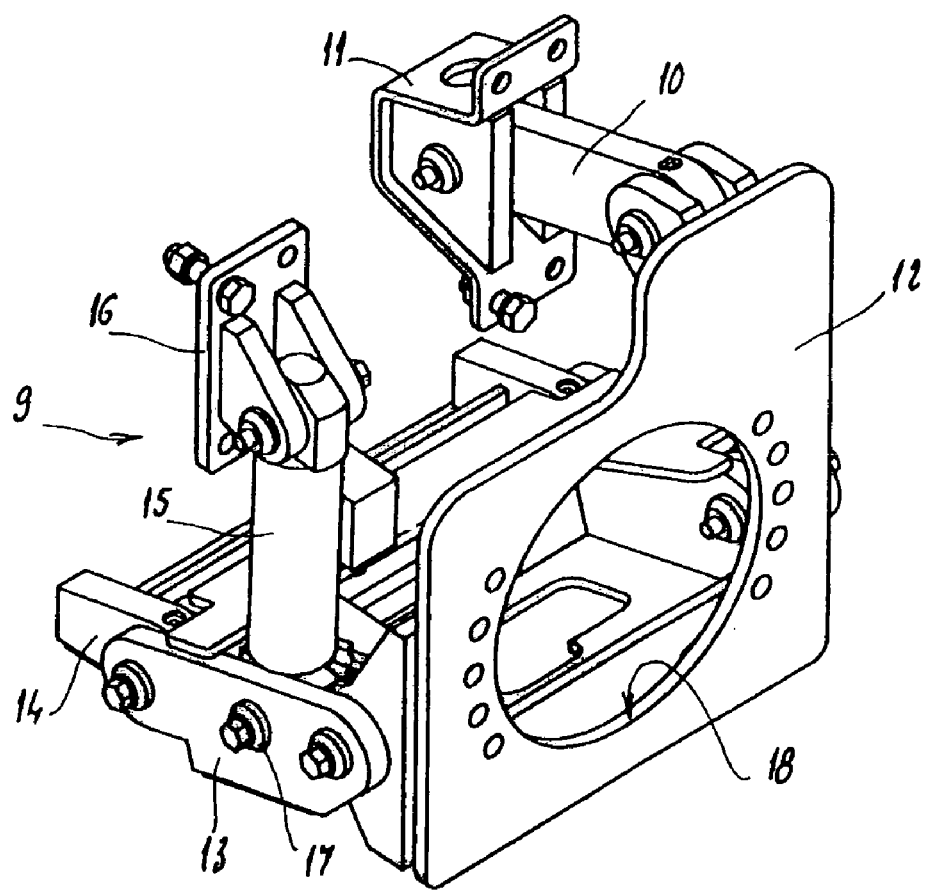
FIG. 5 represents, in perspective, the suspension of one of the wheels of this carrier vehicle.

FIGS. 1 to 3 represent, in its entirety, a carrier vehicle which comprises a rigid, single-piece chassis 2 and four wheels, all driving wheels, i.e. two first driving wheels 3 and 4 situated on the right-hand longitudinal side of the chassis 1 and two other driving wheels 5 and 6 situated on the left-hand longitudinal side of the chassis 2.

The chassis 2, of parallelepipedal general shape, has a flat and horizontal top face 7, situated at a low height, less than one meter, above the ground 8 over which the carrier vehicle moves via its four wheels 3 to 6.

Each driving wheel 3 to 6 has an independent suspension, designated in its entirety by 9, which is more especially visible in FIGS. 4 and 5. The suspension in question is a parallelogram suspension 9, having a first connecting rod 10 linking a fastener 11 to a vertical plate 12, and a second connecting rod 13 linking another fastener 14 to the vertical plate 12, the two fasteners 11 and 14 being fixedly connected to the chassis 2. The two connecting rods 10 and 13 are staggered, on the one hand, in height and, on the other hand, in the longitudinal direction of the carrier vehicle. The suspension 9 further comprises a hydraulic jack 15, substantially vertical, which links another fastener 16, fixedly connected to the chassis 2, to an intermediate point 17 on the second connecting rod 13, the jack 15 being situated on the opposite side to the first connecting rod 10.

The vertical plate 12 comprises a circular central opening 18, through which a hydraulic motor 19 (for each of the right-hand wheels 3 and 4) or 20 (for each of the left-hand wheels 5 and 6) is placed. Each hydraulic motor 19 or 20 is fixed on the rim of the opening 18 and the corresponding wheel is directly mounted on this hydraulic motor 19 or 20, in front of the plate 12.

The hydraulic system, accommodated in the chassis 2, comprises a hydraulic reservoir 21, an oil cooler 22, a first motor-driven pump unit 23, which feeds the two hydraulic motors 19 associated respectively with the two right-hand wheels 3 and 4, and a second motor-driven pump unit 24, which feeds the two hydraulic motors 20 associated respectively with the two left-hand wheels 5 and 6. FIG. 1 gives a precise example of the arrangement of these components, whereas FIG. 4 provides a diagrammatized and partial representation thereof. In one variant (not illustrated), the two independent motor-driven pump units 23 and 24 are replaced by a unit composed of two hydraulic pumps and of a drive motor common to these two pumps.

Since the particular machine is in this case a drilling machine, the chassis 2 of the carrier vehicle, previously described, bears, on the one hand, at the front, a first drilling arm 25 and bears, on the other hand, at the rear, a second drilling arm 26. The front drilling arm 25 comprises, in particular, a drilling guide 27, passed along by a rock drill 28, the basic position of the guide 27 being horizontal and orientated perpendicularly to the longitudinal direction of displacement (arrow F) of the carrier vehicle, running over the ground 8 via its four wheels 3 to 6. Similarly, the rear drilling arm 26 comprises, in particular, a drilling guide 29, along which moves a rock drill 30, the basic position of the guide 29 being horizontal and orientated perpendicularly to the longitudinal direction of displacement (arrow F) of the carrier vehicle.

From their basic position, the front 25 and rear 26 drilling arms can describe various movements prompted by hydraulic motors or jacks (here not detailed) in order to position the drilling guides 27 and 29. The hydraulic functions of the two drilling arms 25 and 26 are fed via a first adjustment block 31, for the front drilling arm 25 and its rock drill 28, and a second adjustment block 32, for the other drilling arm 26 and its rock drill 30.

The assembly formed by the carrier vehicle and its drilling equipment 25 to 30 further comprises electrical power and control components, including:

an electrical power cabinet 33, placed on one side of the chassis 2;

a radio control 34 for controlling the ground displacements of the carrier vehicle;

an electrical relay box 35 for each drilling arm 25 or 26;

a telecontrol box 36, with cable 37, or with radio control, for the first drilling arm 25;

another telecontrol box 38, with cable 39, or with radio control, for the second drilling arm 26.

All in all, the machine thus constituted is very compact and, in particular, of low height h, less than one meter, which allows it to be used in a mine gallery 40 whose height H is itself limited and lies, for example, within the range 1 meter to 1.5 meters, as illustrated by FIG. 1. Inside this mine gallery 40, the carrier vehicle moves on the ground 8, driven by its four driving wheels 3 to 6, whose independent suspensions 9, incorporating jacks 15, allow an adjustment to the changes in level and unevennesses in the ground 8, with an independent height "management" for each wheel 3 to 6, the ground clearance G being adjustable for each wheel, for example between 15 cm and 30 cm. By using the radio control 34, the operator controls the translation of the carrier vehicle, according to the arrow F, and its changes of direction, obtained by a different actuation of the two right-hand driving wheels 3 and 4, on the one hand, and of the two left-hand driving wheels 5 and 6, on the other hand, the carrier vehicle thus being directed by "slippage". The carrier vehicle is especially displaced parallel to the drilling face, towards which the two drilling arms 25 and 26 with their respective rock drills 28 and 30 are directed, the two telecontrol boxes 36 and 38 allowing each drilling arm 25 or 26 to be driven separately.

It would still be possible to remain within the scope of the invention, as defined in the appended claims:

- by modifying the arrangement of the various hydraulic and electrical members accommodated in the chassis of the carrier vehicle;
- by mounting on this chassis all kinds of working equipment, which might include not only drilling equipment but also rockbolting or other equipment;
- by providing all kinds of controls, especially telecontrols, for the functions of the carrier vehicle and/or of its equipment.

What is claimed is:

1. A carrier vehicle for a drilling or rockbolting machine, wherein the carrier vehicle comprises a chassis and four wheels,
    - wherein all four wheels are driving wheels, and two driving wheels are situated on the right-hand side of the chassis of the carrier vehicle and two other driving wheels are situated on the left-hand side of the chassis,
    - the four driving wheels having an independent suspension and having a height independently controlled by driving means,
    - each wheel comprising motorized rotation-drive means, and
    - the chassis receiving, at the front or at the rear, or at the front and at the rear, working equipment, comprising at least one of:
        drilling equipment; and
        rockbolting equipment.

2. The carrier vehicle according to claim 1, wherein the independent suspension of each of the four driving wheels is a deformable-parallelogram suspension, actuated by a hydraulic jack allowing adjustment of a ground clearance for each wheel.

3. The carrier vehicle according to claim 1, wherein the four driving wheels are non-steerable wheels and their motorized rotation-drive means comprise, for the two wheels situated on the right-hand side of the chassis, respective hydraulic motors fed by a first pump or a first motor-driven pump unit, and for the two wheels situated on the left-hand side of the chassis, respective hydraulic motors fed, independently of the other hydraulic motors, by a second pump or a second motor-driven pump unit.

4. The carrier vehicle according to claim 3, wherein the two motor-driven pump units are electric motor-driven pump units.

5. The carrier vehicle according to claim 1, wherein the chassis contains a hydraulic reservoir, common to a whole of hydraulic displacement and working members and equipment of the drilling or rockbolting machine.

6. The carrier vehicle according to claim 1, wherein a top face of the carrier vehicle chassis is situated at a low height, less than about one meter, above the ground over which the carrier vehicle moves using the wheels.

7. The carrier vehicle for a drilling machine according to claim 1, wherein the chassis bears, at the front and at the rear, a front drilling arm and a rear drilling arm respectively, each with a drilling guide, substantially horizontal and oriented substantially perpendicular to the longitudinal direction of displacement of the carrier vehicle on the wheels.

8. The carrier vehicle according to claim 1, wherein the carrier vehicle comprises at least one of:
    telecontrols;
    radio controls; and
    cable-transmitted telecontrols,
    for ground movement of the carrier vehicle and for positioning and movement of the front and rear drilling arms or of other working equipment.

* * * * *